US010769935B2

(12) United States Patent
Frenette et al.

(10) Patent No.: US 10,769,935 B2
(45) Date of Patent: Sep. 8, 2020

(54) METHOD AND APPARATUS FOR UNIFIED MOBILE APPLICATION FOR INSTALLATION OF SECURITY PRODUCTS

(71) Applicant: Sensormatic Electronics, LLC, Boca Raton, FL (US)

(72) Inventors: Stephan Frenette, Montreal (CA); Gabriel Labrecque, Saint-Jean-sur-Richelieu (CA); Jean-Sebastien Decoste, St-Hubert (CA)

(73) Assignee: Sensormatic Electronics, LLC, Boca Raton, FL (US)

( * ) Notice: Subject to any disclaimer, the term of this patent is extended or adjusted under 35 U.S.C. 154(b) by 298 days.

(21) Appl. No.: 15/263,301

(22) Filed: Sep. 12, 2016

(65) Prior Publication Data
US 2018/0075731 A1    Mar. 15, 2018

(51) Int. Cl.
*G08B 29/04*    (2006.01)
*G08B 13/196*    (2006.01)
*G06F 3/0484*    (2013.01)
*G06F 3/0482*    (2013.01)
(Continued)

(52) U.S. Cl.
CPC ........... *G08B 29/04* (2013.01); *G06F 3/0484* (2013.01); *G06Q 10/06* (2013.01); *G06Q 10/06395* (2013.01); *G06Q 10/20* (2013.01); *G08B 13/196* (2013.01); *G06F 3/0482* (2013.01)

(58) Field of Classification Search
CPC ..... G06F 3/0482; G06F 3/0484; G08B 29/04; G08B 13/196
See application file for complete search history.

(56) References Cited

U.S. PATENT DOCUMENTS 8,630,741 B1 * 1/2014 Matsuoka ........... H04L 12/2829
                                                          700/276
9,019,069 B2    4/2015 Mahapatra et al.
9,501,915 B1 * 11/2016 Laska .................... H04N 7/181
(Continued)

FOREIGN PATENT DOCUMENTS

EP        2546815 A1    1/2013
WO    2012135563 A1    4/2012

OTHER PUBLICATIONS

International Search Report and Written Opinion of the International Searching Authority, dated Nov. 17, 2017, from International Application No. PCT/US2017/050959, filed Sep. 11, 2017. 12 pages.
(Continued)

*Primary Examiner* — Shourjo Dasgupta
(74) *Attorney, Agent, or Firm* — HoustonHogle LLP

(57) ABSTRACT

A testing system and method for a security system is disclosed. In one example, the testing system includes a mobile computing device carried by an operator such as a technician and a configuration server, the configuration server communicating with one or more of an intrusion detection subsystem, video surveillance subsystem, and/or access control subsystem and providing testing information to the mobile device. In one embodiment, the testing system provides configuration information to security devices within the subsystems, where the configuration information includes associations between the devices of the subsystems for executing testing upon the devices in the associations.

20 Claims, 14 Drawing Sheets

(51) Int. Cl.
  *G06Q 10/00* (2012.01)
  *G06Q 10/06* (2012.01)

(56) References Cited

U.S. PATENT DOCUMENTS

| | | | |
|---|---|---|---|
| 10,071,475 B2* | 9/2018 | Lin | B25J 11/008 |
| 10,454,783 B2* | 10/2019 | Burks | G06F 3/04842 |
| 2006/0092019 A1* | 5/2006 | Fallon | G08B 13/19656 |
| | | | 340/541 |
| 2006/0135064 A1 | 6/2006 | Cho et al. | |
| 2006/0253205 A1* | 11/2006 | Gardiner | G05B 15/02 |
| | | | 700/19 |
| 2007/0300198 A1* | 12/2007 | Chaplin | G06F 17/5095 |
| | | | 716/122 |
| 2008/0039063 A1 | 2/2008 | Ichieda | |
| 2009/0070436 A1* | 3/2009 | Dawes | G06Q 30/02 |
| | | | 709/219 |
| 2010/0023865 A1* | 1/2010 | Fulker | G06F 3/04817 |
| | | | 715/734 |
| 2010/0245107 A1* | 9/2010 | Fulker | H04L 12/2803 |
| | | | 340/691.6 |
| 2012/0036220 A1* | 2/2012 | Dare | G06F 8/61 |
| | | | 709/217 |
| 2012/0124799 A1 | 5/2012 | Addy | |
| 2012/0130513 A1* | 5/2012 | Hao | G05B 15/02 |
| | | | 700/90 |
| 2012/0188072 A1 | 7/2012 | Dawes et al. | |
| 2012/0254401 A1* | 10/2012 | Adams | H04L 12/2818 |
| | | | 709/224 |
| 2013/0006847 A1 | 1/2013 | Hammad et al. | |
| 2014/0068486 A1* | 3/2014 | Sellers | G06F 3/04847 |
| | | | 715/771 |
| 2014/0075514 A1* | 3/2014 | Prasad | G06F 21/78 |
| | | | 726/4 |
| 2014/0195952 A1* | 7/2014 | Champagne | G06F 3/04842 |
| | | | 715/771 |
| 2014/0218164 A1 | 8/2014 | Mahapatra et al. | |
| 2014/0317029 A1* | 10/2014 | Matsuoka | G05B 15/02 |
| | | | 706/12 |
| 2015/0082225 A1* | 3/2015 | Shearer | G06F 3/0482 |
| | | | 715/771 |
| 2015/0140990 A1* | 5/2015 | Kim | H04W 8/186 |
| | | | 455/418 |
| 2015/0296599 A1* | 10/2015 | Recker | H05B 37/0272 |
| | | | 315/153 |
| 2015/0351145 A1* | 12/2015 | Burks | G08C 17/02 |
| | | | 455/41.3 |
| 2016/0027262 A1* | 1/2016 | Skotty | G08B 13/19632 |
| | | | 340/541 |
| 2016/0065414 A1* | 3/2016 | Sundermeyer | H04L 41/12 |
| | | | 370/254 |
| 2016/0112374 A1* | 4/2016 | Branca | H04L 63/102 |
| | | | 726/1 |
| 2016/0165663 A1* | 6/2016 | Shanmugam | H04W 76/10 |
| | | | 370/338 |
| 2017/0048700 A1* | 2/2017 | Huang | H04W 12/04 |
| 2017/0054571 A1* | 2/2017 | Kitchen | H04L 12/2818 |
| 2017/0064412 A1* | 3/2017 | Taxier | H04N 21/8133 |
| 2017/0091998 A1* | 3/2017 | Piccolo, III | G08B 13/00 |
| 2018/0294989 A1* | 10/2018 | Cosserat | G08C 17/02 |

OTHER PUBLICATIONS

Quick Installation Guide, Zmodo Fox IP Camera (IPC_Quick_Guide_pdf), Zmodo Company, Apr. 26, 2013. 3 pages.
International Report on Patentability, dated Mar. 21, 2019, from International Application No. PCT/US2017/050959, filed Sep. 11, 2017, 7 pages.

* cited by examiner

METHOD AND APPARATUS FOR UNIFIED MOBILE APPLICATION FOR INSTALLATION OF SECURITY PRODUCTS

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include subsystems such as intrusion detection subsystems that include security devices ("devices") such as intrusion panels and door and window contact switches, otherwise known as relays, access control subsystems that include devices such as access control readers and door controllers, and video surveillance subsystems that include devices such as surveillance cameras ("cameras") and network video recorders (NVRs), to list a few examples.

Consider the access control subsystems. The access control readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards or bringing contactless smart cards within range (approximately 2-3 inches or 5 centimeters) of a reader. The access control readers read the information of the keycards and then the access control readers determine if the individuals are authorized to access the restricted areas. If the individuals are authorized to enter the restricted areas, then the access control readers allow access to the restricted areas by signaling door controllers that might unlock locked doors, signaling that doors should be unlocked, or generating alarms upon unauthorized entry, for example.

Consider the video surveillance subsystems. Video surveillance systems are often used for a number of different tasks, such as intelligence gathering by governments and businesses, prevention or investigation of crime by law enforcement or retail establishments, and monitoring the usage of resources or structures such as buildings, to list a few examples.

A number of components/devices are common to many of these video surveillance systems. Surveillance cameras capture image data that are typically then sent over one or more data networks, such as governmental, service provider, enterprise or home networks. This image data are typically stored on network video recorders (NVRs). Video analytics systems are often included to analyze the image data. Finally, control systems are often used to control the surveillance systems and coordinate the operation of the components.

These video analytics systems have the capability of automatically analyzing image data to detect and determine temporal and spatial events. Minimally, these systems track objects against fixed background scenes. More sophisticated functions include object detection to determine the presence of an object or a type of object. Even higher level functions include object analysis, such as object identification.

The methods employed by video analytics systems for detecting and analyzing classes of objects in image data have become more accurate in recent years, and are, as a consequence, becoming more and more important in video surveillance systems. Two common examples of object analysis within image data are facial recognition of individuals and license plate recognition, or number plate recognition. Some of these video analytics systems are sophisticated enough to identify a particular person from their facial characteristics, and can identify a particular license plate by reading and recognizing the text and numbers within the license plate, in examples.

Finally, consider the intrusion detection subsystems. These subsystems typically include door and window relays that are installed to determine whether a door or window has been opened. In the situation where the intrusion panels have been armed, an opening of a door detected by a door relay can be used to generate an alarm. In other case, the intrusion detection subsystems can be used in conjunction with access control subsystems to monitor when a door has been opened after it has been unlocked or when the access control subsystem has been circumvented and the door forced open, for example.

SUMMARY OF THE INVENTION

Security systems are technically challenging to install and configure. One reason is that the security devices of the security systems are typically included within the functionally separate subsystems, and each of the devices requires device-specific setup and testing to ensure that the devices are configured properly in accordance with security objectives. Another reason is that it is often the case that multiple devices within the different subsystems are required to implement a given security objective. For this purpose, in one example, security camera security devices of a video surveillance subsystem often work in conjunction with card reader security devices of an access control subsystem. The security cameras may be configured to record video near a door or entranceway only when a card reader installed at the same door receives credentials of an authorized individual at the door, for example. Security cameras for example, must be positioned such that their fields of view properly overlap such that all sensitive areas to be monitored are visible and there are no dead zones, while motion sensor security devices of an intrusion detection subsystem must typically be individually wired to and tested at an alarm panel of the intrusion detection subsystem. As a result, in addition to the numerous detailed tasks that an operator or installer needs to perform to install and test each security device within each subsystem, the security devices must work in combination across the different subsystems of the security system.

Accordingly, an aspect of the present invention is an application ("app") executing on a mobile device that assists a security technician during installation of security devices. When a customer orders a sequence of security devices for a building, the product details are loaded into the app. At the customer site/premises, the operator is walked through a sequence of operations for configuring, registering and testing each subsystem. The app also walks the technician through the procedure for testing the entire system including interactions between subsystems such as video surveillance, intrusion detection, and the access control subsystems. At the end of the job the app generates a report that outlines the equipment that was installed, the tests that were performed, and any other relevant details (for example, the operator that performed the installation, the site, etc.).

An application to streamline installations for security installers and customers can be leveraged during the full sales cycle from the estimation process to the installation through to maintenance. The application will decrease the complexity caused by installing 3 systems in combination, thus reducing the install time, increase the level of service provided by installers, decrease unnecessary return visits and give greater visibility into the products being recommended, used and replaced.

The application consists primarily of an enrollment method for controllers using QR code technology. As the QR code will contain all required information, the application will be able to use that information to configure a System remotely without the use of a local Workstation. Additionally, the application will perform commissioning and generate test reports after enrollments.

One part of the invention is the ability to group multiple devices from different subsystem systems such as access, intrusion detection and/or video surveillance to form one logical group known as an association that enables the devices in the association to be configured and commissioned together. For example, a front door, with a motion detector and a camera pointing at that door can all be grouped together and tested together to ensure all is working as intended. In the past, each component was tested separately, often by different installers.

In general, according to one aspect, the invention features a testing system for a security system. The testing system comprises a mobile device used by a technician and a configuration server communicating with one or more of an intrusion detection subsystem, video surveillance subsystem, and/or access control subsystem and providing testing information to the mobile device.

In general, according to another aspect, the invention features a method for testing a security system. The method comprises displaying status information from an intrusion detection subsystem, video surveillance subsystem, and/or access control subsystem on a mobile device of a technician and providing configuration information to the intrusion detection subsystem, the video surveillance subsystem, and/or the access control subsystem from the mobile device.

Preferably, the configuration information includes associations between devices of the intrusion detection subsystem, the video surveillance subsystem, and/or the access control subsystem.

In general, according to another aspect, the invention features a method for configuring a security system. The method comprises inputting device information of a security system into a mobile device by decoding encoded labels on devices and sending the device information to a configuration server communicating with one or more of an intrusion detection subsystem, video surveillance subsystem, and/or access control subsystem and providing testing information to the mobile device.

In general, according to another aspect, the invention features an application executing on a mobile device that enables scanning of a device of a security system and creating an association of the device with a controller of the device.

Preferably, the application further allows the testing of the device with the controller and/or allows the testing of other devices that are part of the intrusion detection subsystem, the video surveillance subsystem, and/or the access control subsystem.

The application can further display image data from surveillance cameras associated with the device of the security system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
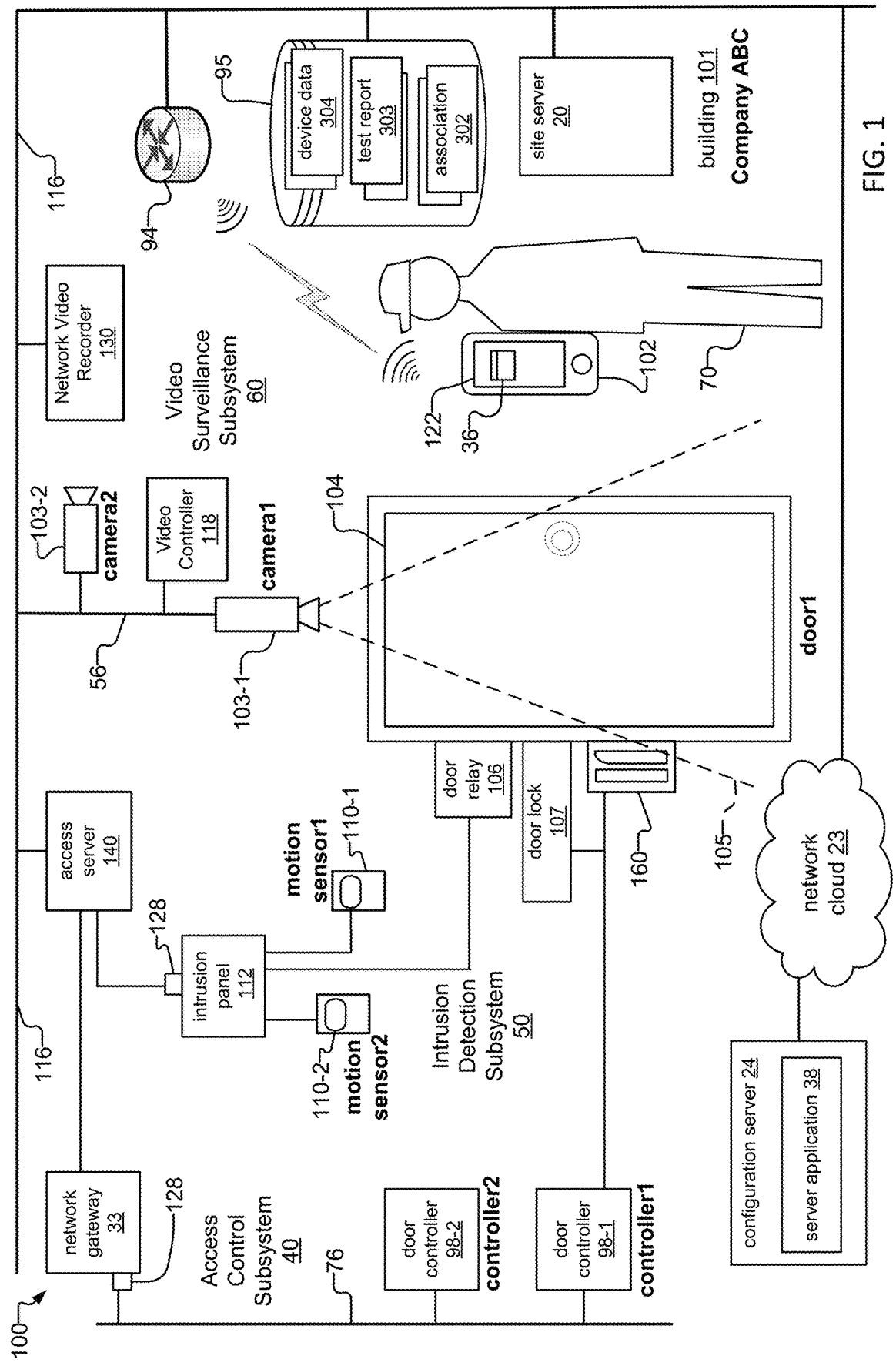
FIG. 1 is a schematic diagram showing an exemplary security system installed at a building of a customer site, for example, to which the present invention is applicable, where the security system includes devices that operate within different subsystems of the security system (e.g. intrusion detection, video surveillance, and access control subsystems) that communicate over a security network of the security system; a testing system is used to install, configure and/or service the security system.

FIG. 1 shows a security system 100 installed at a premises, such as within building 101 of exemplary company "Company ABC." Company ABC is a customer of a security company that installs and manages the security system 100.

The security system 100 includes subsystems and components that communicate over a security network 116 within each premises/customer site. The subsystems include an access control subsystem 40, an intrusion detection subsystem 50 and a video surveillance subsystem 60, in examples. The security network 116, in one example, is a high-bandwidth network such as 10 Gigabit Ethernet that supports internet-based (IP) communications protocols. Other components that communicate over the security network 116 include a network video recorder 130, an access server 140, a local database 95, and a site server 20. Security devices ("devices") are included within each of the subsystems 40/50/60.

In examples, the video surveillance subsystem 60 includes devices such as cameras 103, namely camera1 103-1 and camera2 103-2, and a video controller 118 for controlling the cameras 103. The cameras 103 and the video controller 118 communicate over a surveillance network 56 which in turn communicates with the security network 116. Camera1 103-1 has a field of view 105 that includes an area near access point door1 104.

The intrusion detection subsystem 50 includes devices such as an intrusion panel 112, motion sensors 110 such as motion sensor1 110-1 and motion sensor2 110-2 and a door relay 106, in examples. The door relay 106 senses opening and/or closing of an access point such as a door 104. The motion sensors 110 sense motion within areas of the building 101, The motion sensors 110 and the door relay 106 are typically connected individually to the intrusion panel 112 and communicate with the intrusion panel 112 via serial communications protocols, in one example. Via a network interface 128, the intrusion panel 112 can send and receive information over the security network 116 via the access server 140.

The access control subsystem 40 includes devices such as door controllers 98, namely door controller1 98-1 and door controller2 98-2 and an access control reader 160, in examples. Each access control reader 160 is connected to a door controller 98. When a user swipes a keycard at an access control reader 160 located near an access point such as a door 104, the access control reader 160 sends signals to its associated door controller 98 indicating whether the user is an authorized user. In response to receiving signals which indicate that the user is authorized, the controller 98, in turn, activates a door lock 107 associated with the door 104 to enable the authorized user to gain access to the building 101 through the access point 104.

An operator 70 carrying a mobile computing device 102 such as a smart phone can utilize a management application, or "app" 36 executing on the mobile device 102 to configure, test, and service the devices within the security system 100. For this purpose, in one example, an access router 94 provides a local wireless network such as WiFi or bluetooth between the security network 116 and a wireless-ready mobile device 102. The mobile device 102 includes a display screen 122 for displaying screens of information within the app 36 for enabling interaction between the operator 70, the site server 20, the configuration server 24, and the devices.

A configuration server 24 located remote to the security system 100 of each customer site/premises includes a server application 38. The configuration server 24 communicates with the security network 166 of the security system 100 via a network cloud 23. In one implementation, the configuration server 24 provides device data 304 for the devices within each security system 100. The site server 20 within the security system 100 discovers all devices within the security system 100 and its subsystems 40/50/60, and notifies the configuration server 24 regarding the discovered devices. In response, the configuration server 24 pushes the device data 304 for configuring the devices to a local database 95. In another implementation, the configuration server 24 lacks initial information for the devices within the security system 100 and their device data 304. In this example, the site server queries each of the devices as part of the discovery process for their device data 304 and saves the device data 304 to the local database 95. The app 36 reads the device data from the local database 95, and pushes the device data 304 to the configuration server 24.

In addition to storing device data 304, the local database 95 also stores test reports 303 and associations 302. Associations 302 are logical groupings or collections of related devices associated with a specific security objective. In one example, a security objective is to configure and test all devices associated with a door access point 104, though the devices associated with the door 104 are included within different subsystems and therefore require separate configuration and testing. For example, an association "front entrance" could be created within the app 36 that includes camera1 103-1 and video controller 118 from the video surveillance subsystem 60, motion sensor1 110-1, door relay 106 and intrusion panel 128-1 from the intrusion detection subsystem 50, and controller1 98-1 and access card reader 160 from the access control subsystem 40.

The configuration server 24, in conjunction with the mobile device 102, provides a testing system for security systems 100 including one or more of an intrusion detection subsystem 50, video surveillance subsystem 60, and/or access control subsystem 40. The testing system provides testing information to the mobile device, where testing information can include status information sent from devices within the subsystems 40/50/60 and configuration information sent to the devices within the subsystems 40/50/60. In examples, the configuration information includes the associations 302 between devices of the intrusion detection subsystem 50, the video surveillance subsystem 60, and/or the access control sub system 40.

Figure 2:
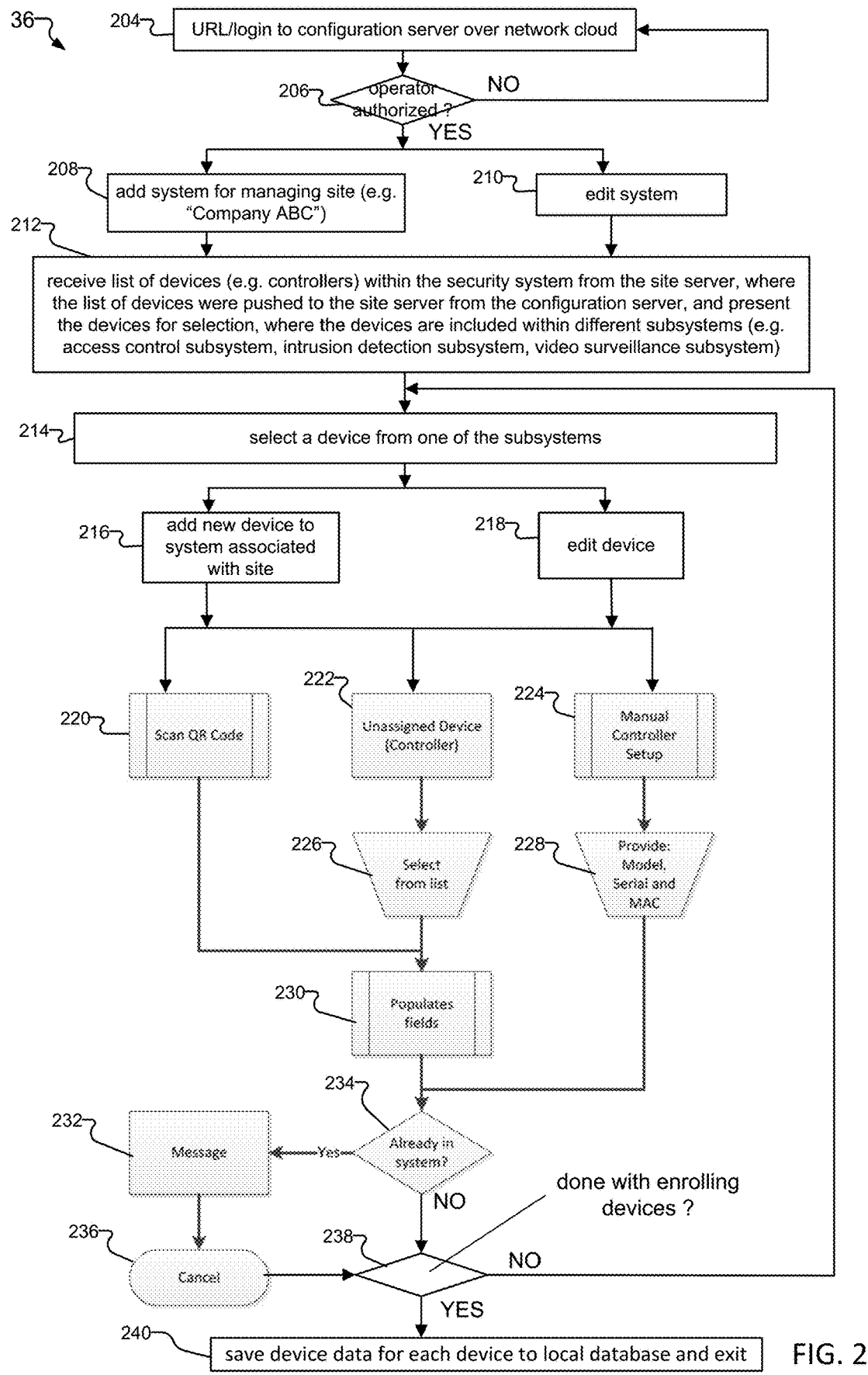
FIG. 2 is a flow chart for a method that describes how an operator carrying a mobile user device of the testing system such as a mobile phone can utilize an application ("app") running on the mobile phone to configure devices within a security system in accordance via a configuration server with principles of the invention.

FIG. 2 is a flow chart that describes a method of an app 36 executing on a mobile phone 102 of the testing system for configuring devices within the security system 100.

In step 204, the app receives a universal resource locator (URL) and login information entered by an operator 70. The login information includes information such as credentials to the configuration server 24 over a network cloud 23. If the operator 70 is not authorized by the configuration server 24 in step 206, the method transitions back to step 204. Otherwise, the method transitions to steps 208 or 210.

In steps 208 and 210, the app 36 either adds a system element for managing the security system 100 for the current customer site (here, "Company ABC") or edits an existing system element in response to operator 70 action, respectively. Upon conclusion of steps 208 and 210, the method transitions to step 212.

According to step 212, the app 36 receives a list of devices (e.g. controllers) within the security system 100 from the site server 20, where the list of devices were pushed to the site server 20 from the configuration server 24, and presents the devices for selection on the display screen 122. The devices are included within different subsystems (e.g. access control subsystem 40, intrusion detection subsystem 50, and/or video surveillance subsystem 60).

In step 214, the app 36 selects a device from one of the subsystems 40/50/60 in response to operator 70 selection. In steps 216 and 218, the app 36 either adds a new device to the system associated with the customer site, or edits an existing device, respectively.

Then, upon selection of the device within the app 36, in accordance with steps 224, 222, and 220, respectfully the operator can either manually configure each device, accept the current configuration of an unassigned/pre-configured device, or select a QR code 109 of an encoded label applied to the device that encodes device data 304 for the device. For an unassigned device 222 such as a controller, the operator 70 selects the unassigned controller device from the list of available controllers discovered by the site server 20 in step 226, and data fields of the device data 304 are populated. In response to scanning the QR code in step 220, the app 36 also populates the data fields of the device data 304 in step 230. Upon manual controller setup 224 including addition of model number, serial number and Media Access Control (MAC) address in step 228, the method transitions to step 234.

In step 234, if the device data 234 provided from traversing the paths of steps 220, 222 or 224 already exists, the app 36 generates an error message in step 232 and cancels the configuration of the device data 304 for the device. If more devices are to be configured/enrolled/edited as part of the system in step 238, the method transitions back to the beginning of step 214 to process more devices. Otherwise, the method transitions to step 240 to save the device data 304 for each device to the local database 95.

Figure 3:
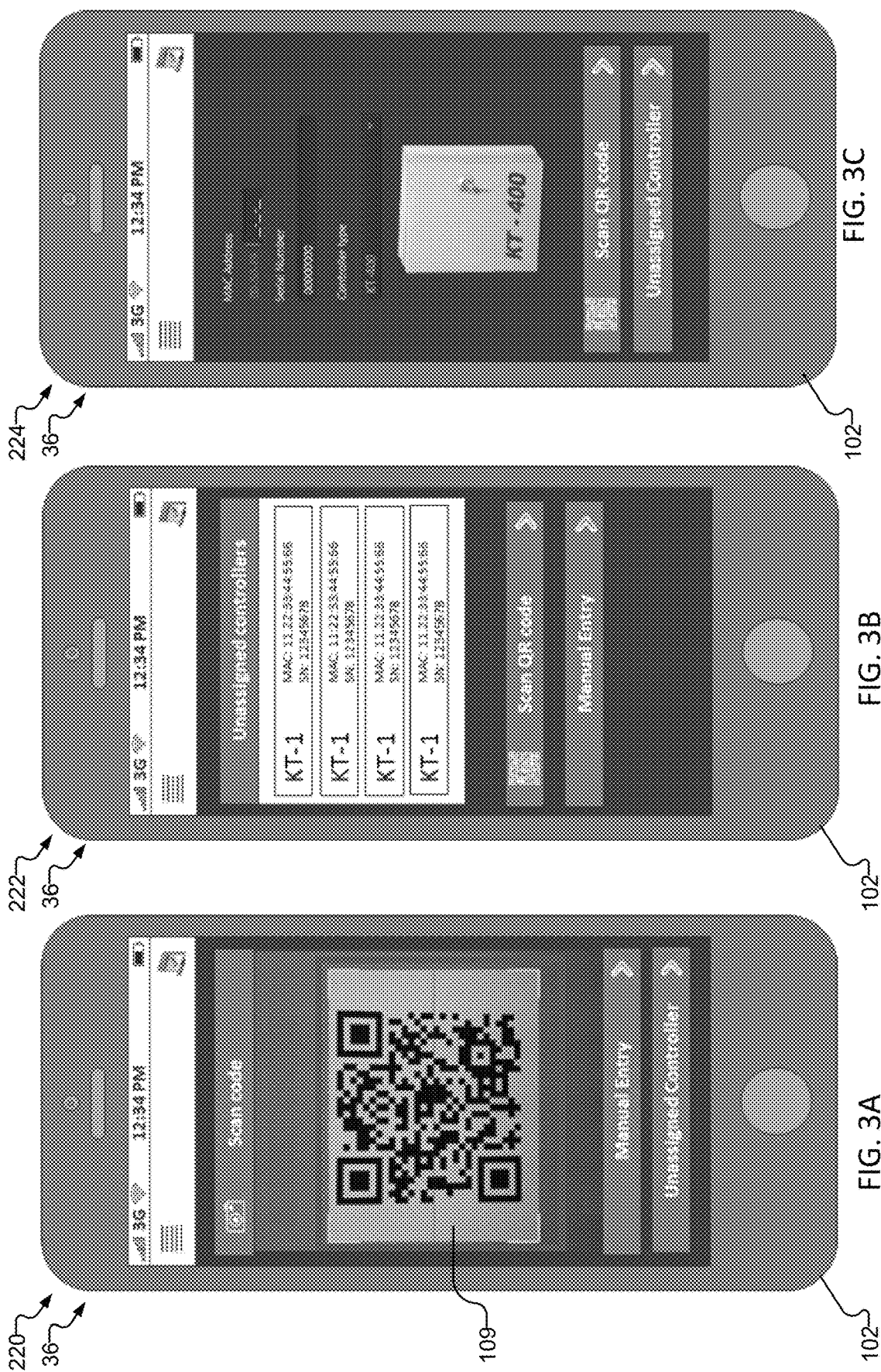
FIG. 3A-3C show three different display screens of testing information generated by the app executing on a mobile phone or mobile computing device and displayed on the touchscreen display of the mobile computing device for configuration and display of the devices, in accordance with steps 220, 222, and 224 of the method of FIG. 2, respectively.

FIG. 3A-3C show three different display screens of testing information of the app 36 on a mobile phone or other mobile computing device 102 for configuration and display of the devices, in accordance with steps 220, 222, and 224 of the method of FIG. 2, respectively. In FIG. 3A, QR. code 109 of an encoded label applied to an exemplary device is shown, where the QR code encodes the device data 304 for the device. Four exemplary unassigned controllers are displayed in FIG. 3B, and a manually configured controller is displayed in FIG. 3C.

Figure 4:
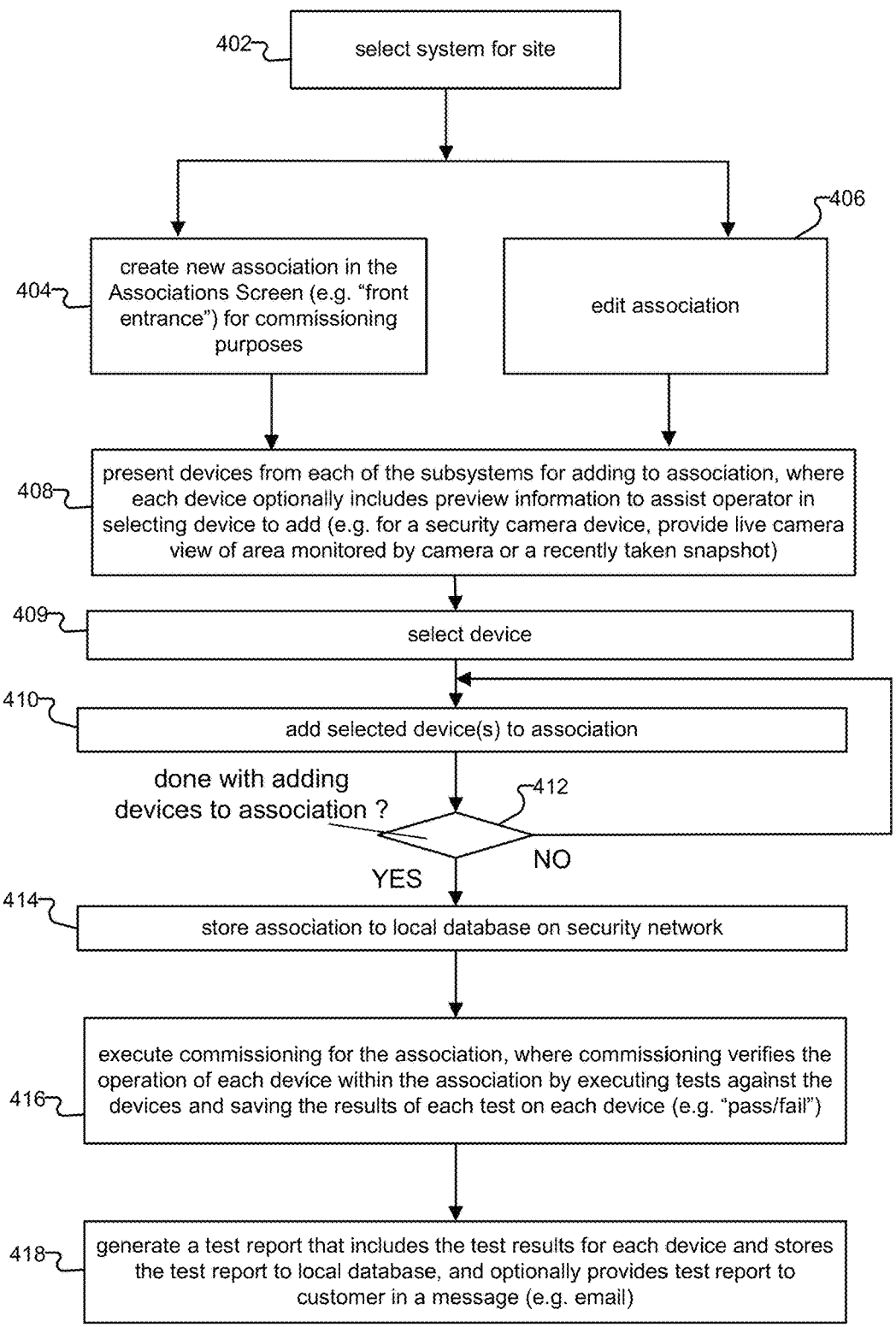
FIG. 4 is a flow chart for a method which describes the ability to add devices to logical groupings, also known as associations, and how an operator or installer can use the associations for executing commissioning of the associations, where commissioning provides verification testing of the devices in each association and enables generating of test reports that include results from the testing of the devices in the associations.

FIG. 4 is a flow chart for a method which describes the ability to add devices to associations 302 within the app 36, and how an operator or installer can use the associations 302 for executing commissioning for the devices included in each association. Commissioning provides verification testing of the devices in each association and enables generating of test reports that include results from the testing of the devices in the associations 302, in examples.

By way of an example, the description that accompanies FIG. 4 herein below selects three devices within the subsystems 40/50/60 to add to an association 302 having the name "front entrance" 502. With respect to FIG. 1, the association 302 having the name "front entrance" 502 is created by the operator in accordance with the security objective of managing different devices for monitoring and controlling access to access point door1 104. In the example, devices associated with door1 selected for addition to the association 302 having the name "front entrance" 502 include controller1 98-1 of the access controller subsystem 40, camera1 103-1 of the video surveillance subsystem 60, and motion sensor 1 110-1 of the intrusion detection subsystem 50.

In step 402, a system is selected within the app 36 for a security system 100 of a customer site (here, "Company ABC") by an operator 70.

Figures 5A, 5B:
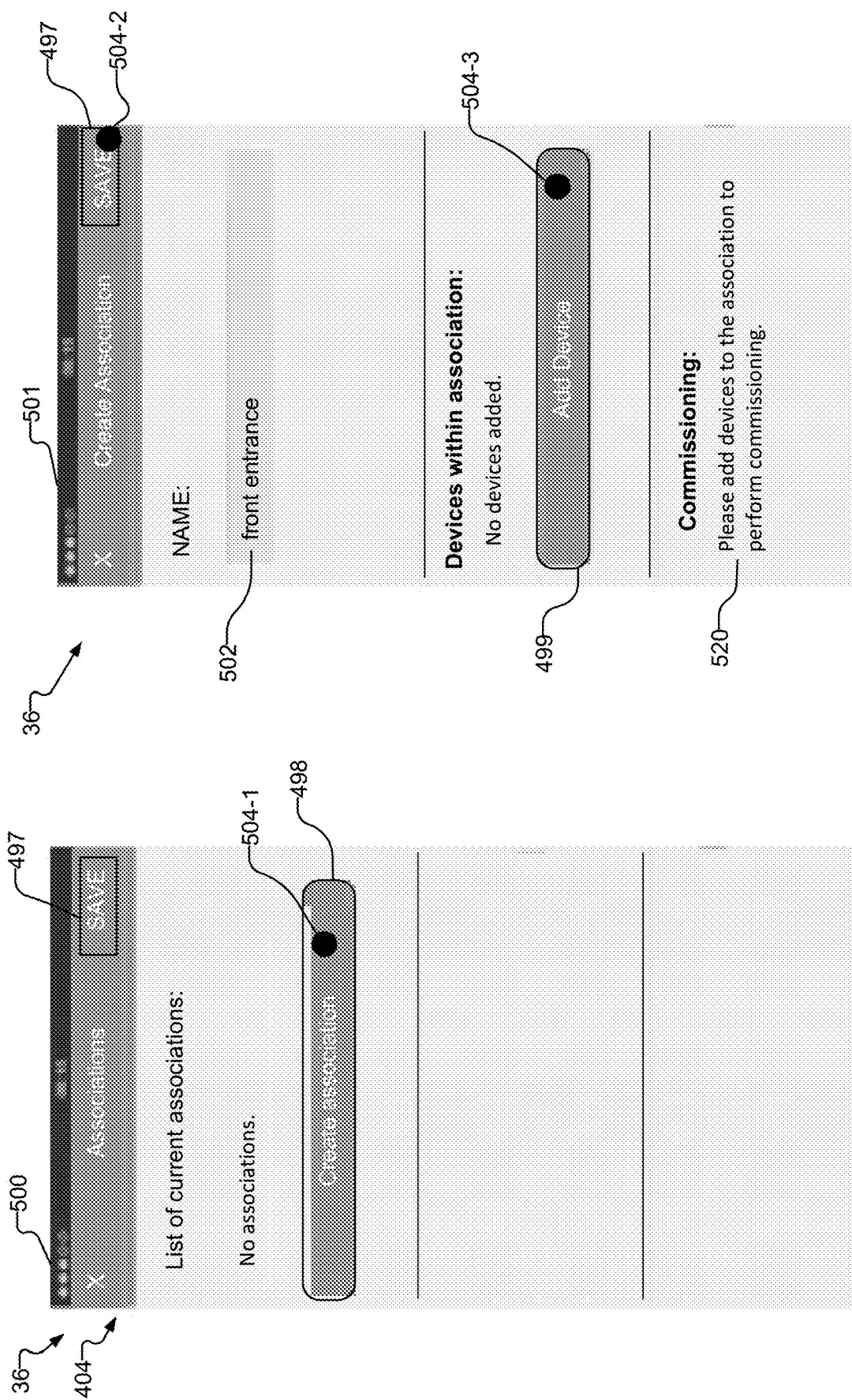
FIG. 5A shows an "Associations" screen of the app for creation, display, and editing of associations of devices.
FIG. 5B shows a "Create Associations" screen of the app that is displayed in response to operator creation of exemplary association "front entrance," where the operator created association "front entrance" for configuration and commissioning of devices associated with access point door1 in FIG. 1.

FIG. 5A shows an "Associations" screen 500 of the app 36 for creation, display, and editing of associations 302. The Associations screen 500, like many screens of the app 36, includes buttons for enabling selection of additional features and saving results. The Associations screen 500 includes a Create Associations button 498. Currently, no associations exist within the app 36 for the security system 100 of Company ABC.

Returning to FIG. 4, in steps 404 and 406, respectively, an operator can then either create a new association 302 or edit an existing association 302 within the app 36. In FIG. 5A, as indicated by reference 504-1, the operator has selected the Create Associations button 498 to create a new association 302 for the security system 100 of Company ABC.

FIG. 5B shows a "Create Associations" screen 501 of the app 501 that is displayed in response to operator selection of the Create Associations button 498 in FIG. 5A. A new association 302 with association name 502 "front entrance" is created, where the operator 70 created association "front entrance" for configuration and commissioning of devices associated with access point door1 104 in FIG. 1.

Also displayed within FIG. 5B is the Add Device 499 button and preview text 520, which are displayed in response to the creation of the new association 302. Notice that the preview information 520 indicates that for commissioning to be executing on the association 302, the operator has to add one or more devices to the association 302.

As indicated by reference 504-2, the operator selects the save button to save association 302 having association name 502 "front entrance," and selects the Add Device 499 button as indicated by reference 504-3.

Returning to FIG. 4, in step 408, the app 36 presents devices from each of the subsystems 40/50/60 for adding to the association 302, where each device optionally includes preview information 520 to assist the operator 70 in selecting the device to add (e.g. for a camera 103 device, provide a live camera view of area monitored by camera 103 or a recently taken snapshot).

Figure 6:
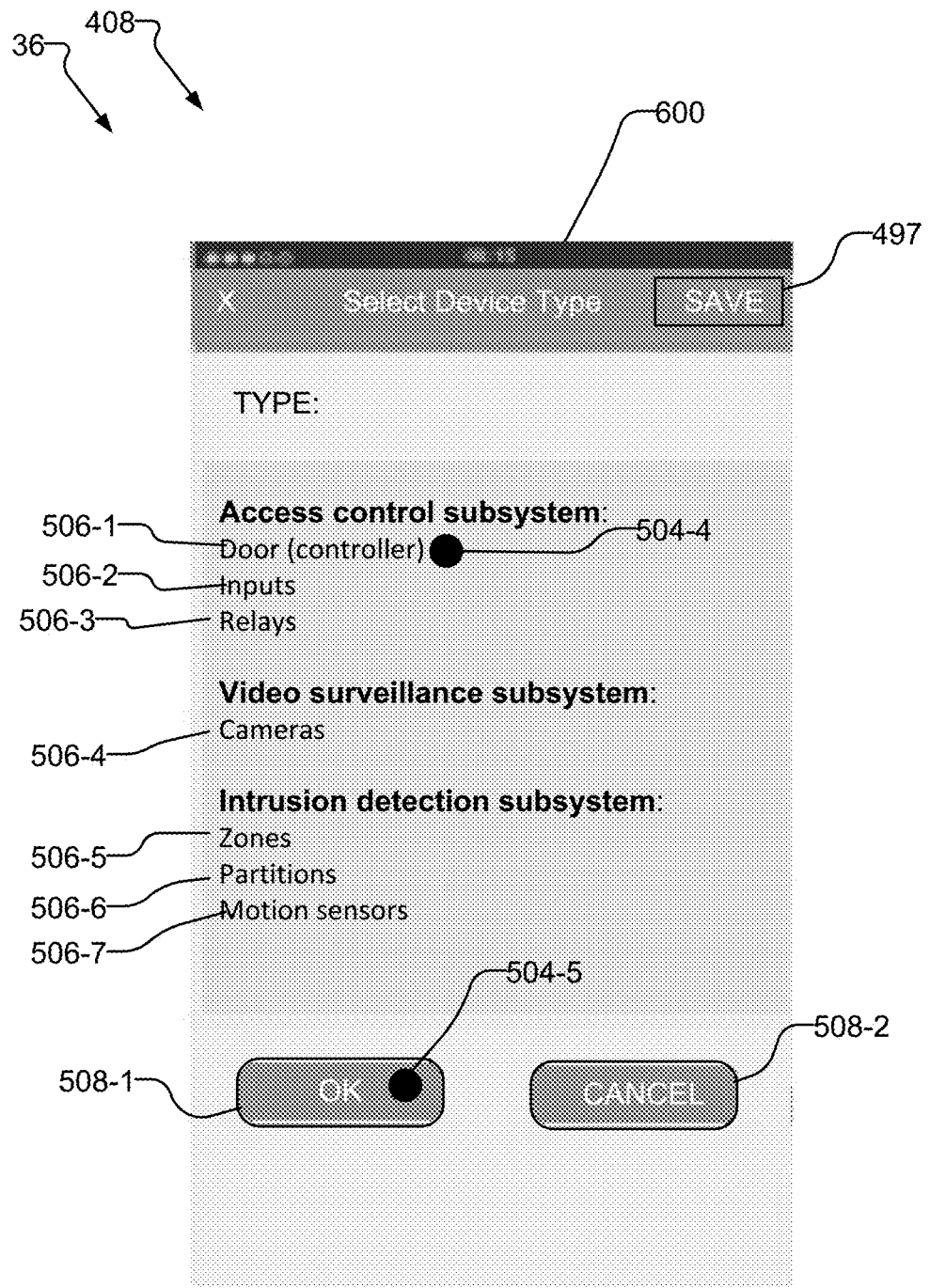
FIG. 6 shows a "Select Device Type" screen of the app, which enables operators to select devices for adding to associations, where the operator has selected device type "door (controller)" of the access control subsystem to add a specific door controller to association "front entrance"

FIG. 6 shows a "Select Device Type" screen 600 of the app 36, The Select Device Type screen 600 presents the available devices for selection to add to the association 302, according to device type 506 and subsystem 40/50/60. Within the access control subsystem 40, the available device types 506, in one example, include device type 506-1 for door controllers 98, 506-2 for input devices, and 506-3 for relays such as a door relay 106. Within the video surveillance subsystem, the available device types 506 include device type 506-4 for cameras 103. Finally, within the intrusion detection subsystem 60, the available device types include device type 506-5 for zones, 506-6 for partitions, and 506-7 for motion sensors 110. OK Button 508-1 commits a device type 506 selection, where button 508-2 cancels a device type 506 selection.

Returning to FIG. 4, in step 409, the app 36 selects a device in response to operator 70 selection of a device. As seen in the Select Device Type screen 600 of FIG. 6, as indicated by reference 504-4, the operator has selected device type door controller 506-1 and has selected the OK button 508-1 as indicated by reference 504-5 to commit the selection.

Figure 7:
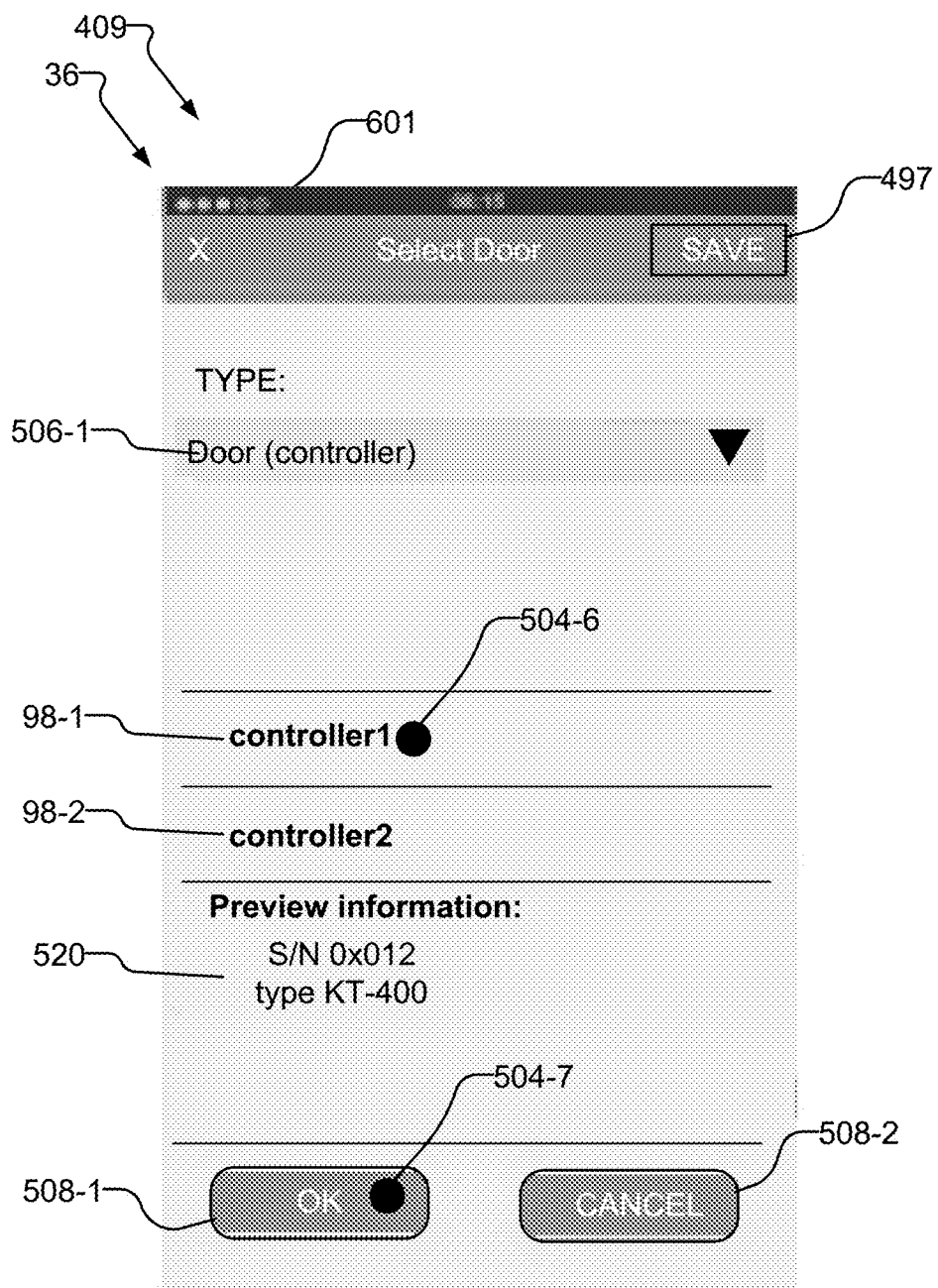
FIG. 7 shows a "Select Door" screen of the app executing on a mobile phone or mobile computing device and displayed on the touchscreen display of the mobile computing device for adding a specific door controller from a list of available door controllers to the association "front entrance"

FIG. 7 shows a "Select Door" screen of the app 36 for adding a specific door controller 98 from a list of available door controllers to the association "front entrance." The available door controllers include controller1 98-1 and controller2 98-2. As indicated by reference 504-6, the operator has selected controller1 98-1 to add to the association 302. Also note that in response to selection of controller1 98-1, device-specific preview information 520 for the selected device appears. As indicated by reference 504-7, the operator has selected the OK button 508-1 to commit the selection.

Returning to FIG. 4, in step 410, the app 36 adds the selected device to the association 302.

Figure 8:
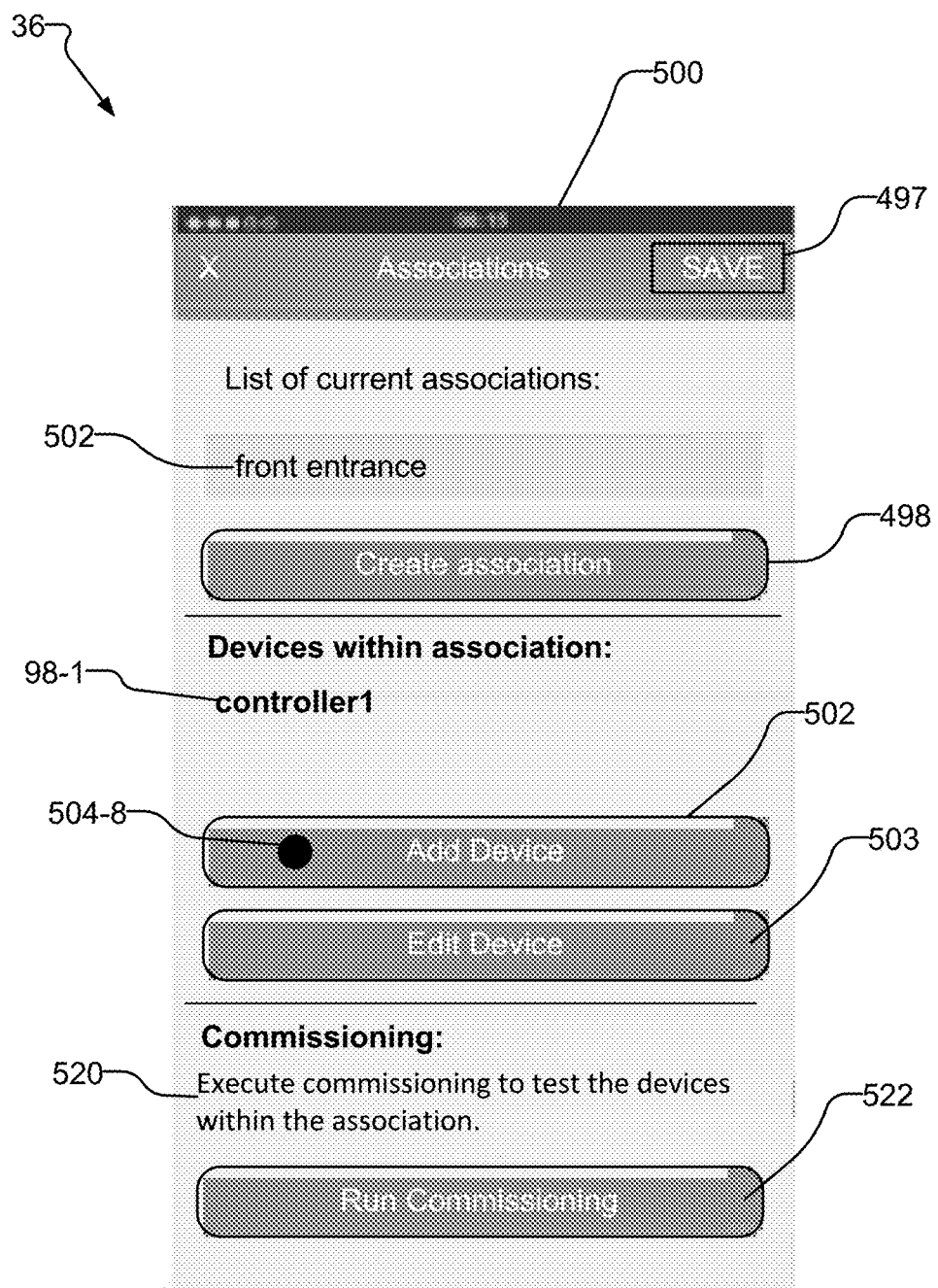
FIG. 8 shows the "Associations" screen of the app executing on a mobile phone or mobile computing device and displayed on the touchscreen display of the mobile computing device, which reflects the addition of door controller "controller1" to association "front entrance" in FIG. 7.

FIG. 8 shows an updated "Associations" screen 500 of FIG. 8, which now includes controller1 98-1 among the devices added to association 302 having association name 502 "front entrance." Also in FIG. 8, note that the "run commissioning" button 522 is now displayed within the Associations screen 500 and the preview information 520 has changed in response to the addition of the device. The "run commissioning" button 522 is displayed because there is now at least one device included within the association 302.

As indicated by reference 504-8 in the updated "Associations" screen 500 of FIG. 8, the operator then selects the Add Device button 502 to add another device to the association 302 having association name 502 "front entrance."

Figure 9:
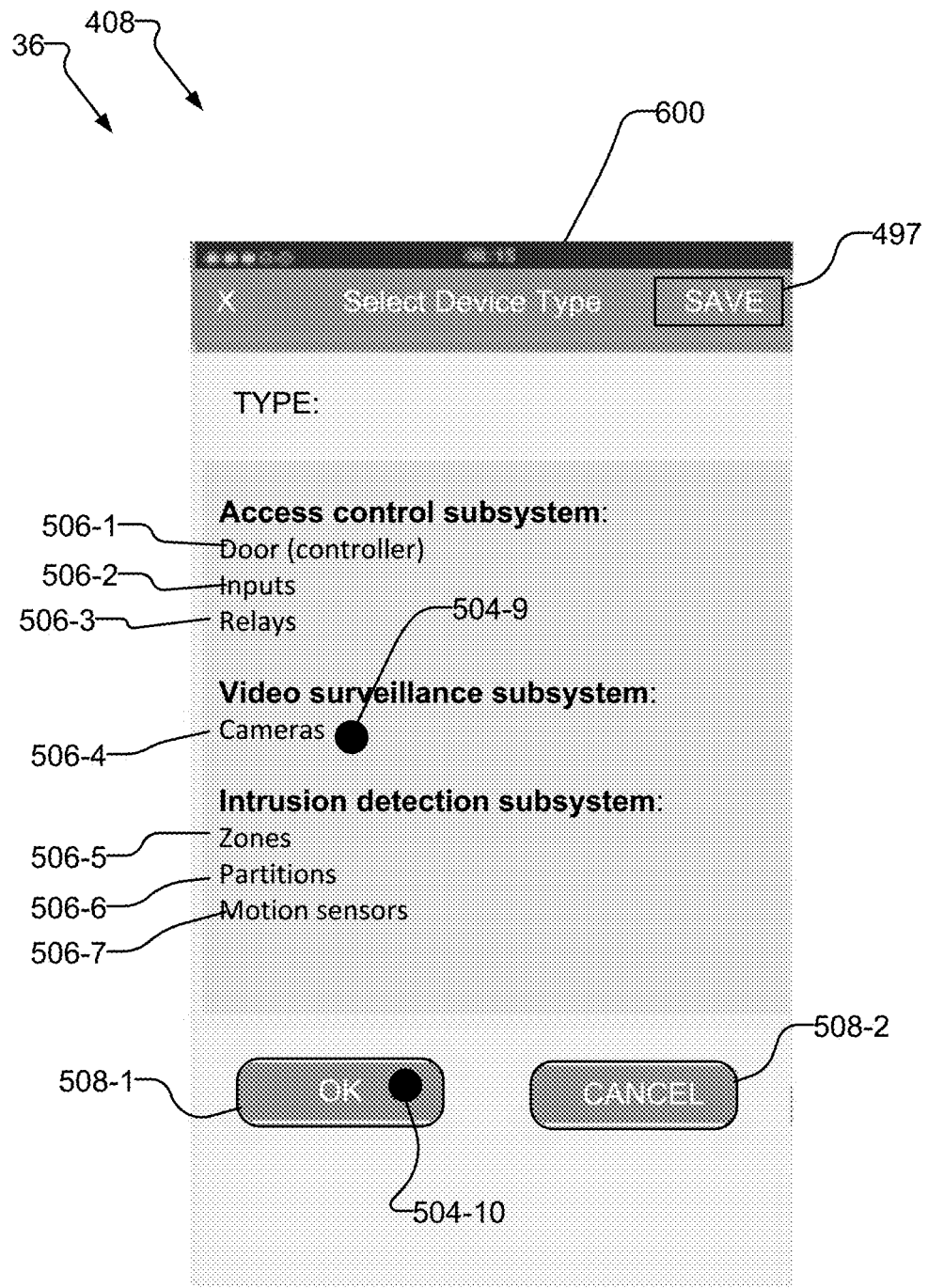
FIG. 9 shows the "Select Device Type" screen of the app executing on a mobile phone or mobile computing device and displayed on the touchscreen display of the mobile computing device, where the operator has selected a device type of another device to add to association "front entrance", where the operator has selected device type "camera" of the video surveillance subsystem.

FIG. 9 shows the "Select Device Type" screen of the app, where the operator has selected device type 506-4 for adding a camera 103 to association name "front entrance" 502. This is indicated by reference 504-9, and the operator has selected the OK button 508-1 to commit the selection as indicated by reference 504-10.

Figure 10:
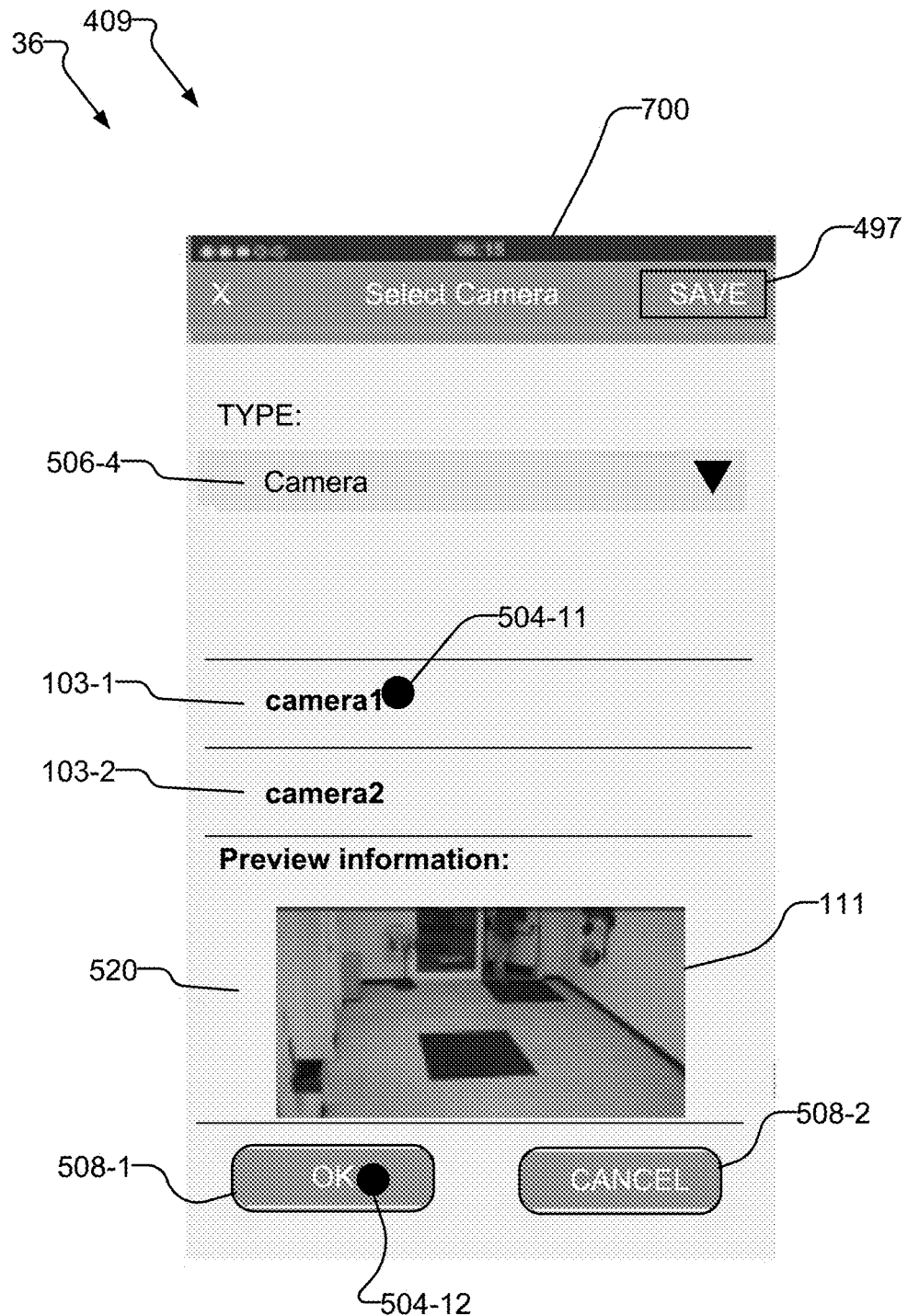
FIG. 10 shows a "Select Camera" screen of the app executing on a mobile phone or mobile computing device and displayed on the touchscreen display of the mobile computing device for adding a specific camera from a list of available cameras to the association "front entrance"

FIG. 10 shows a "Select Camera" screen 700 of the app 36 for adding a specific camera 103 from a list of available cameras to the association name 502 "front entrance." The available cameras are camera1 103-1 and camera2 103-2. As indicated by reference 504-11, the operator has selected camera1 103-1 to add to the association name 502 "front entrance." Also note that in response to selection of camera1 103-1, context specific/device-specific preview information 520 for the selected device appears. The preview information 520 is a recent or live snapshot of image data 111 captured within the field of view 105 of camera1 103-1, just outside door1 104.

Figure 11:
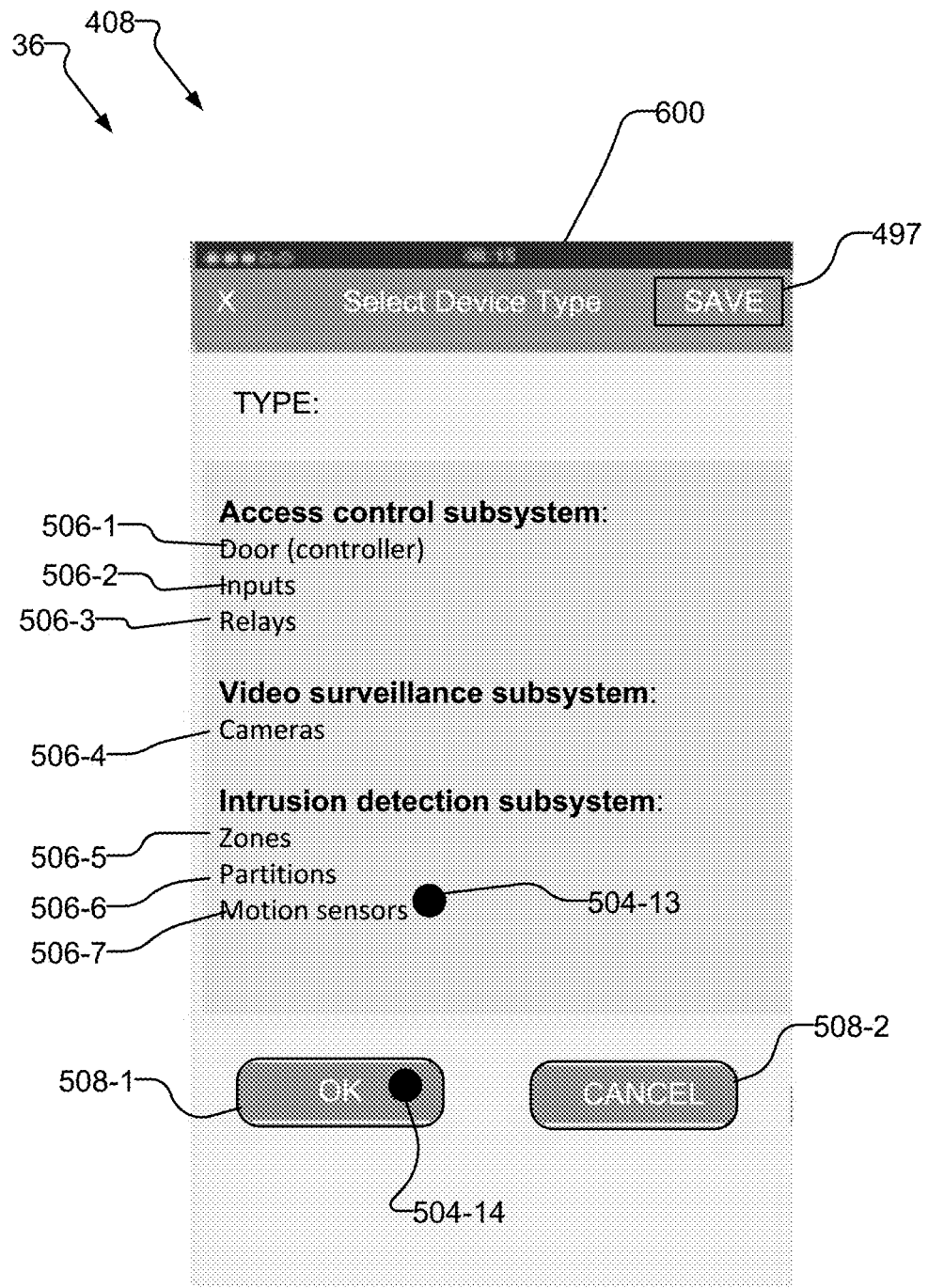
FIG. 11 shows the "Select Device Type" screen of the app executing on a mobile phone or mobile computing device and displayed on the touchscreen display of the mobile computing device, where the operator has selected a device type of yet another device to add to association "front entrance", where the operator has selected device type "motion sensor" of the intrusion detection subsystem.

FIG. 11 again shows the "Select Device Type" screen 600 of the app 36, where the operator has additionally selected device type 506-7 for adding a motion sensor 110 to association name "front entrance" 502. This is indicated by reference 504-13, and the operator has selected the OK button 508-1 to commit the selection as indicated by reference 504-14.

Figure 12:
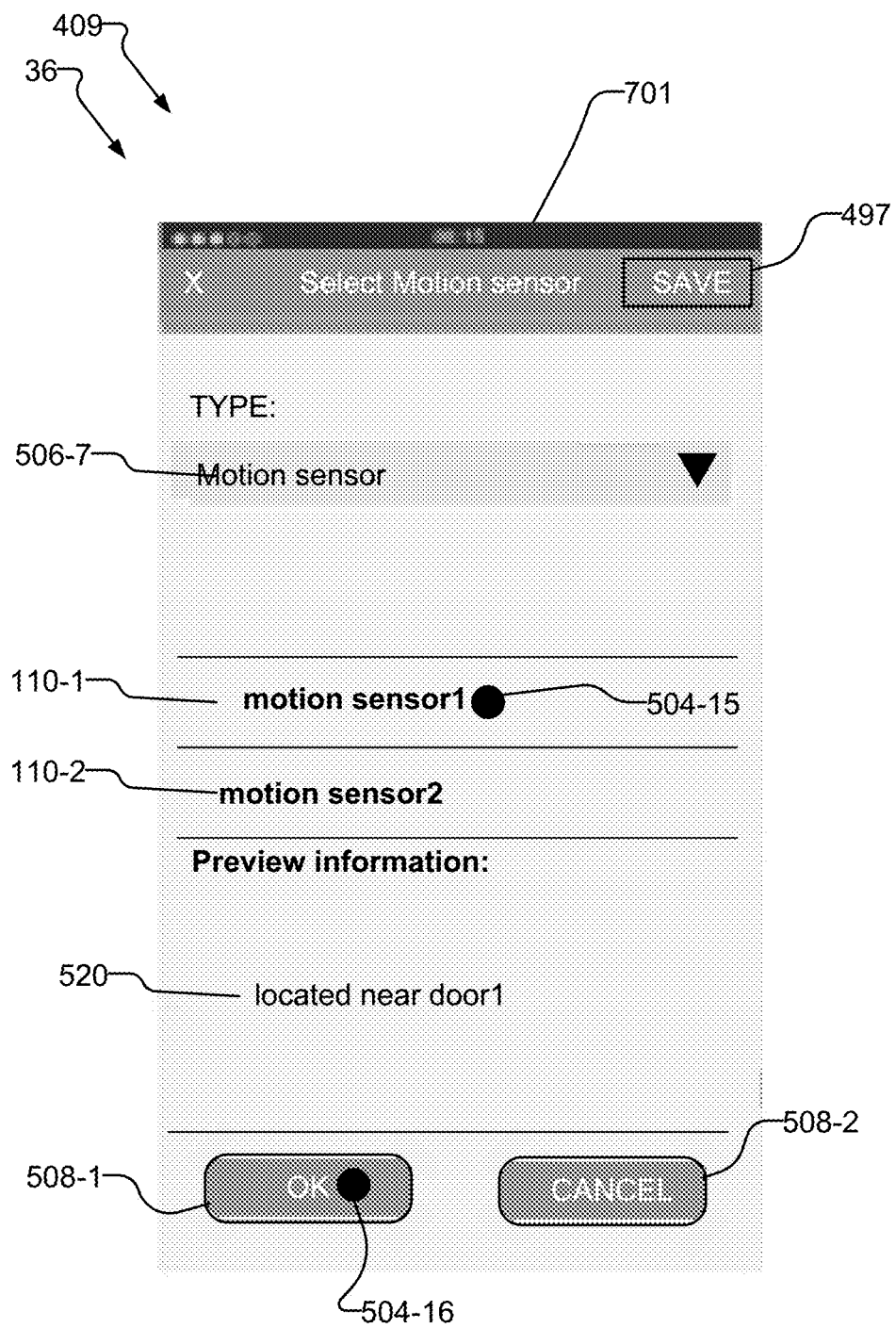
FIG. 12 shows a "Select Motion sensor" screen of the app executing on a mobile phone or mobile computing device and displayed on the touchscreen display of the mobile computing device for adding a specific motion sensor from a list of available motion sensors to the association "front entrance"

FIG. 12 shows a "Select Motion sensor" screen 701 of the app 36 for adding a specific motion sensor 110 from a list of available motion sensors 110 to the association name 502 "front entrance." The available motion sensors 110 are motion sensor1 110-1-1 and motion sensor2 110-2. As indicated by reference 504-15, the operator has selected motion sensor1 110-1 to add to the association name 502 "front entrance." Also note that in response to selection of motion sensor1 110-1, context specific/device-specific preview information 520 for the selected device appears. The operator has selected the OK button 508-1 to commit the selection as indicated by reference 504-16.

Figure 13:
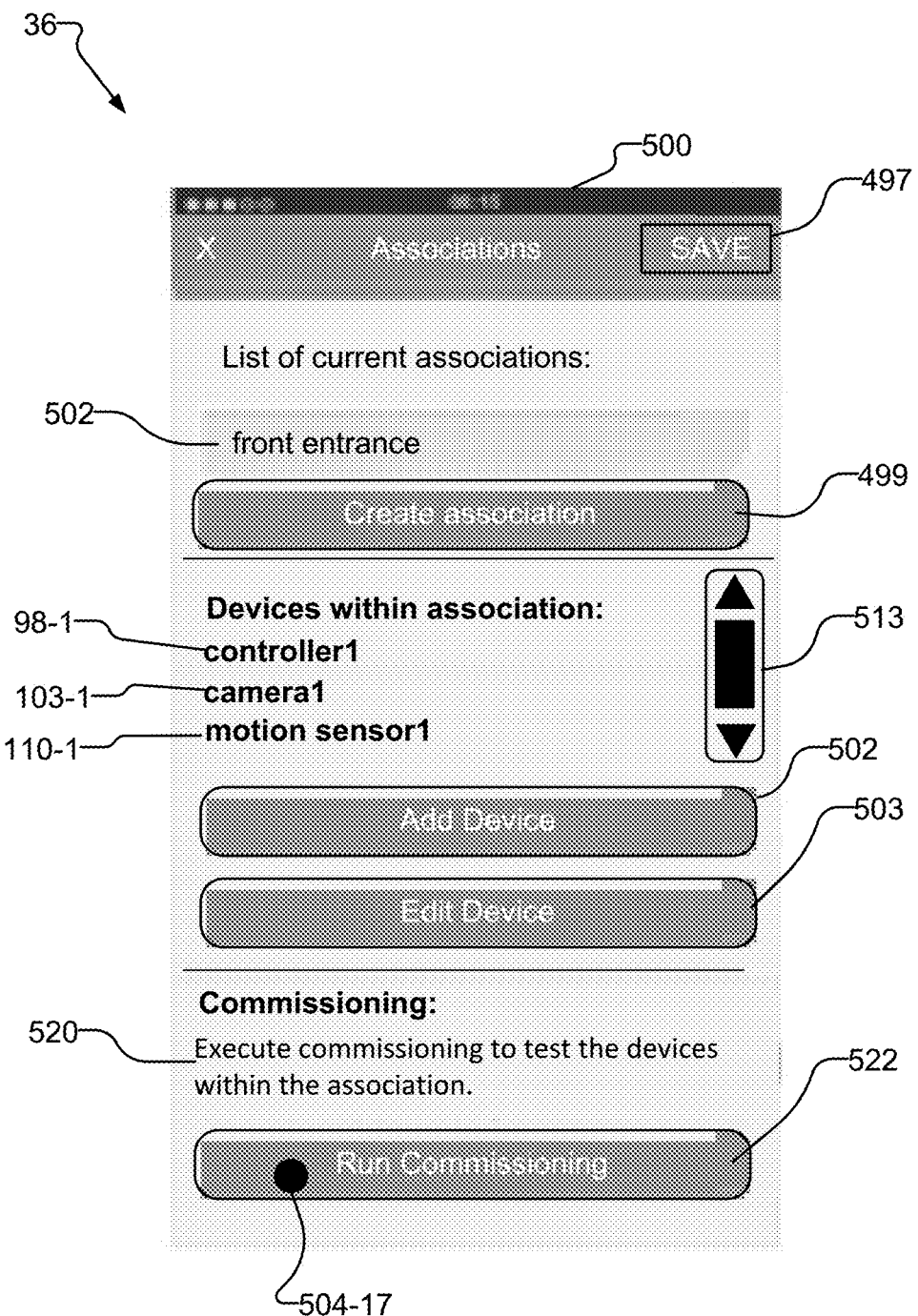
FIG. 13 shows the "Associations" screen of the app executing on a mobile phone or mobile computing device and displayed on the touchscreen display of the mobile computing device, which reflects the addition of the devices added to association "front entrance" in the preceding figures.

FIG. 13 shows an updated "Associations" screen 500 of the app 36, which reflects the addition of the devices added to association name 502 "front entrance" in the preceding figures. Devices controller1 98-1, camera1 103-1, and motion sensor1 110-1 are shown as being included within association name 502 "front entrance." Also note new scrollbar widget 513 has appeared to assist the operator 70 with navigation through the list of devices within the association 302 for improved display, editing and selection purposes.

Returning to FIG. 4, in step 412, the operator is done with addition devices to the association name 502 "front entrance." As a result, the method stores the association 302 to the local database 95 on the security network 116.

Then, in step 416, the operator 70 executes commissioning for the association 302, where commissioning verifies the operation of each device within the association 302 by executing tests against the devices and saving the test results of each test on each device. For this purpose, in FIG. 13, the operator selects the "Run Commissioning" button 522, as indicated by reference 504-17. Finally, in step 418, the app 36 generates a test report 303 that includes the test results for each device and stores the test report 103 to the local database 95, and optionally provides the test report 303 to customer in a message (e.g. email).

Figure 14:
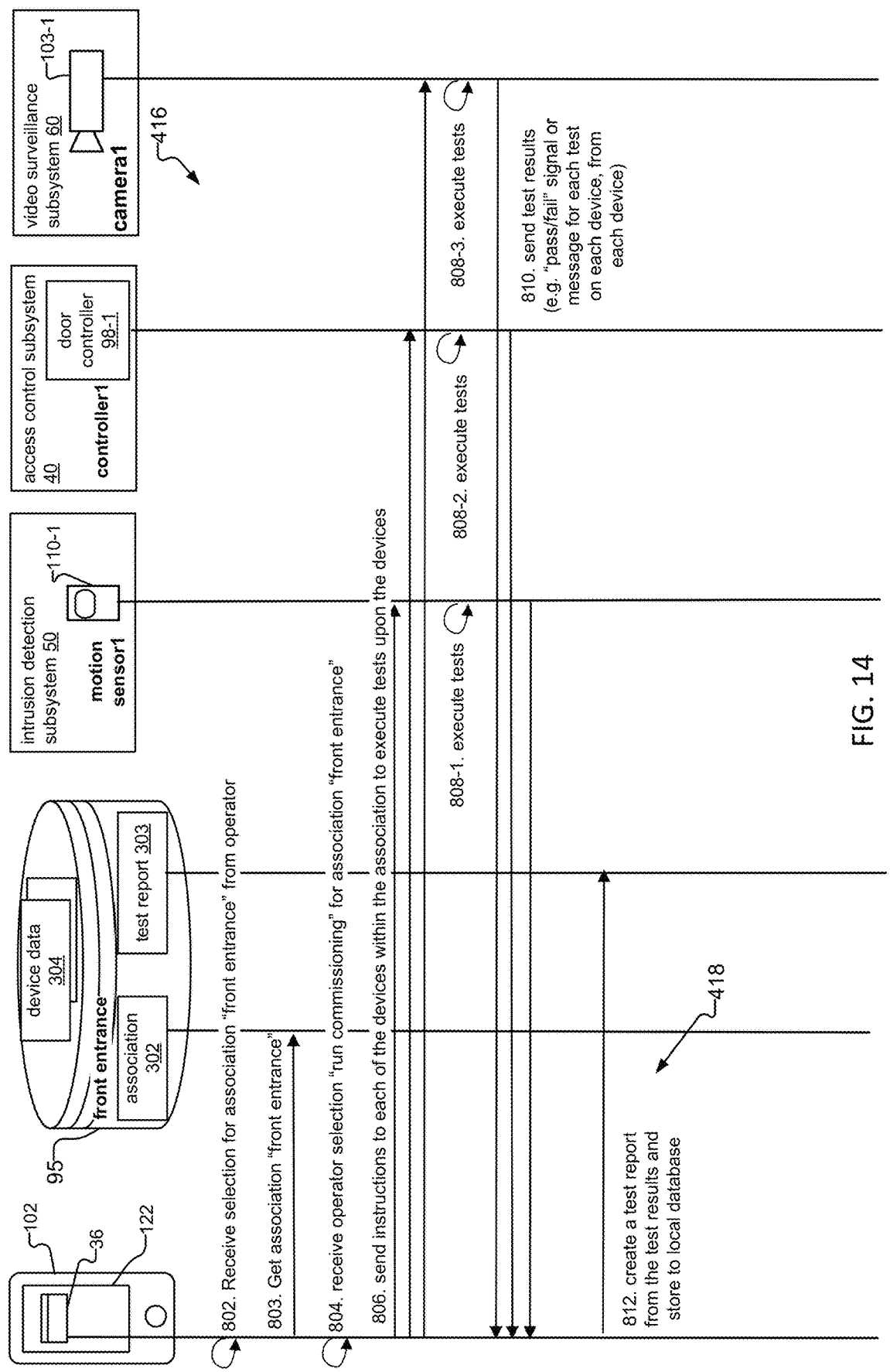
FIG. 14 is a sequence diagram that shows interactions among relevant components of FIG. 1 during execution of commissioning for the devices of association "front entrance."

FIG. 14 is a sequence diagram that shows interactions among relevant components of FIG. 1 during execution of commissioning for the devices of association name 502 "front entrance" and provides details for steps 416 and 418 in FIG. 4.

In step 802, the app 36 receives selection for association name 502 "front entrance" from operator 70. In step 803, the app 36 gets the association 302 having the name 502 "front entrance" from the local database 95. In step 804, the app receives operator selection "run commissioning" within the Associations screen 500 for association 302 having the name 502, "front entrance."

In step 806, the app 36 sends instructions to each of the devices within the association 302 to execute tests upon the devices. In steps 808-1 through 808-3, each of the devices motion sensor1 110-1, controller1 98-1, and camera1 103-1, respectively, execute self-tests. In step 810, the devices send test results back to the app 36. In examples, the test results are in the form of "pass/fail" signals or are included in messages sent from each device. Finally, in step 812, the app 36 creates a test report 303 from the test results and stores the test results 103 to the local database 95.

While this invention has been particularly shown and described with references to preferred embodiments thereof, it will be understood by those skilled in the art that various changes in form and details may be made therein without departing from the scope of the invention encompassed by the appended claims.

What is claimed is:

1. A testing system for a security system, comprising:
   a mobile device used by a technician; and
   a server system communicating with an intrusion detection subsystem, video surveillance subsystem, and access control subsystem of the security system and providing testing information to the mobile device;
   wherein the mobile device provides configuration information for the intrusion detection subsystem, the video surveillance subsystem, and the access control subsystem by displaying the configuration on a display of the mobile device, the configuration information including associations between motion sensors of the intrusion detection subsystem, surveillance cameras of the video surveillance subsystem, and door controllers of the access control subsystem, and wherein the associations are further displayed on the display of the mobile device by displaying a list of the motion sensors, surveillance cameras and door controllers within the associations, the mobile device enables selection of a run commissioning function for the association on the display, and, in response to the technician selecting the run commissioning function for the association, the testing system verifies operation of the motion sensors of the intrusion detection subsystem, the surveillance cameras of the video surveillance subsystem, and the door controllers of the access control subsystem.

2. A testing system as claimed in claim 1, wherein the server system comprises:
   a configuration server located remote to the security system; and
   a site server within the security system that discovers devices within the subsystems, and notifies the configuration server regarding the discovered devices.

3. A testing system as claimed in claim 1, wherein the server system pushes device data for configuring the subsystems to a local database of the security system.

4. A testing system as claimed in claim 1, wherein the mobile device receives a list of devices within the security system from the server system, and presents the devices for selection on a display screen.

5. A testing system as claimed in claim 1, wherein the mobile device enables selection of devices within the subsystems to add to an association to associate the devices.

6. A testing system as claimed in claim 5, wherein the devices are associated with a common access point.

7. A testing system as claimed in claim 1, wherein the mobile device displays image data for security camera devices of the video surveillance subsystem.

8. A testing system as claimed in claim 1, wherein the mobile device is used to execute tests against the devices in an association.

9. A testing system as claimed in claim 1, wherein the mobile device is used to generate reports of tests of the devices in an association.

10. A testing system as claimed in claim 1, wherein the motions sensor, surveillance cameras and door controller in the same association are associated with a same door of a premises.

11. A testing system as claimed in claim 1, wherein the mobile device enables the technician to assign names to each of the associations.

12. A method for testing a security system, comprising:
    displaying status information from an intrusion detection subsystem, video surveillance subsystem, and access control subsystem on a mobile device of a technician; and
    providing configuration information to the intrusion detection subsystem, the video surveillance subsystem, and the access control subsystem from the mobile device, wherein the configuration information includes associations between motion sensors of the intrusion detection subsystem, surveillance cameras of the video surveillance subsystem, and door controllers of the access control subsystem, and wherein the associations are displayed on a display of the mobile device by displaying a list of the motion sensors, surveillance cameras and door controllers within the associations;
    the mobile device enabling selection of a run commissioning function for the associations on the display; and
    in response to the technician selecting the run commissioning function for the associations, verifying operation of the motion sensors of the intrusion detection subsystem, the surveillance cameras of the video surveillance subsystem, and the door controllers of the access control subsystem.

13. A testing method for a security system, comprising:
    a server system communicating with an intrusion detection subsystem, video surveillance subsystem, and access control subsystem of the security system;
    the server system sending testing information to a mobile device operated by a technician, wherein the testing information is based on associations between motion sensors of the intrusion detection subsystem, surveillance cameras of the video surveillance subsystem, and door controllers of the access control subsystem; and
    the mobile device enabling selection of devices within the subsystems to add to an association to associate the motion sensors, surveillance cameras and door controllers wherein the motion sensors, surveillance cameras and door controllers are associated with a common access point and a list of the motion sensors, surveillance cameras and door controllers is displayed on a display of the mobile device;
    the mobile device enabling selection of a run commissioning function for the association on the display; and
    in response to the technician selecting the run commissioning function for the association, verifying operation of the motion sensors of the intrusion detection subsystem, the surveillance cameras of the video surveillance subsystem, and the door controllers of the access control subsystem.

14. A testing method as claimed in claim 13, further comprising the server system discovering devices within the subsystems.

15. A testing method as claimed in claim 13, further comprising pushing device data for configuring the subsystems to a local database of the security system.

16. A testing method as claimed in claim 13, further comprising the mobile device receiving a list of devices within the security system from the server system, and presenting the devices for selection on a display screen.

17. A testing method as claimed in claim 13, further comprising the mobile device displaying image data for security camera devices of the video surveillance subsystem.

18. A testing method as claimed in claim 13, further comprising the mobile device executing tests against the devices in an association.

19. A testing system as claimed in claim 13, wherein the mobile device enables the technician to assign a name to the association.

20. A method for configuring a premises system of a premises, comprising:
- an app executing on a mobile computing device enabling creation of an association for an access point of the premises by displaying create associations function on a touchscreen display of the mobile computing device;
- the app presenting devices from different subsystems including an access control subsystem, an intrusion detection subsystem, and a video surveillance subsystem for addition to the association and displaying preview information to assist the operator in selecting among the presented devices, and wherein the presented devices include a door controller and access control reader of the access control subsystem, a surveillance camera of the video surveillance subsystem, and a motion sensor of the intrusion system;
- the app selecting presented devices in response to operator selection;
- the app adding selected devices to the association for the access point including adding a selected surveillance camera and displaying image data captured within a field of view of the selected surveillance camera on the touchscreen display of the mobile computing device;
- the app storing the association in connection with the access point for a premises;
- the app presenting the devices that were added to the association and enabling selection of a run commissioning function for the association on the touchscreen display in response to the app adding the selected devices to the association; and
- in response to the operator selecting the run commissioning function for the association, verifying operation of the door controller and the access control reader of the access control subsystem, the surveillance camera of the video surveillance subsystem, and the motion sensor of the intrusion system within the association by executing tests against the door controller and access control reader of the access control subsystem, the surveillance camera of the video surveillance subsystem, and the motion sensor of the intrusion system and saving the test results of each test on each device.

* * * * *